United States Patent Office 3,206,504
Patented Sept. 14, 1965

3,206,504
PROCESS FOR PURIFYING ISOPHTHALIC ACID
Frank Joseph Christoph, Jr., North East, Md., Ralph Benjamin Kaplan, Wilmington, Del., and Otto Stallman, Bridgeton, N.J., assignors to E. I. du Pont de Nemours and Company, Wilmington, Del., a corporation of Delaware
No Drawing. Filed Nov. 17, 1961, Ser. No. 154,387
6 Claims. (Cl. 260—525)

This application is a continuation-in-part of our application Serial No. 32,148, filed May 27, 1960, now abandoned.

This invention relates to a process of producing isophthalic acid in a state of high purity. More particularly, this invention deals with a process for purifying commercial grades of isophthalic acid, where the impurity consists chiefly of by-product aromatic carboxylic acids, and where the total amount of said impurities does not exceed 5% by weight of the entire mass.

Isophthalic acid has in recent years been obtained by oxidation of meta-xylene, which in turn is derived from petroleum distillates. The original material, however, is naturally contaminated with para-xylene and toluene, as a result of which the isophthalic acid obtained is likewise contaminated with terephthalic acid, toluic acid and benzoic acid. The bulk of these by-products, however, are readily separable, and accordingly commercial grades of isophthalic acid seldom contain more than 3%, in extreme cases 5%, of such impurities, and the major portion of the latter is generally terephthalic acid. Yet, for certain chemical purposes this residual quantity of impurities is objectionable, and there is an urgent need for isophthalic acid of higher chemical purity.

Accordingly, it is an object of this invention to provide a practical process for producing high-grade isophthalic acid from commercial grades thereof which contain aromatic carboxylic acids, chiefly terephthalic acid, as the impurity and wherein the total of such impurities does not exceed 5% by weight of the whole. Other objects and achievements of this invention will become apparent as the description proceeds.

Now, according to our invention the above objects are achieved neatly and in economical manner by treating the commercial solid mass with reagents whereby to preferentially solubilize the terephthalic acid content of the mass (and incidentally also the monocarboxylic acids) by converting it (and them) into an alkali-metal salt, without simultaneous solubilization of too high quantities of the isophthalic acid, and then separating a solution of the solubilized impurities from the solid bulk of the mass.

The preferential solubilization and simultaneous dissolution of the by-product acids is, according to this invention, achieved by treating the crude mass with a dilute aqueous solution of alkaline reagent such as an alkali-metal salt of a water-soluble weak acid. Under "alkali-metal" here and throughout the discussion which follows we mean to include ammonium. From the viewpoint of availability or cost, lithium and cesium may be omitted from the consideration. Accordingly, the expression alkali-metal salt is meant to include and refer chiefly to salts of sodium, potassium and ammonium, respectively.

By "weak acid" we mean an acid or an acid-salt whose dissociation constant (at 25° C.) lies in the range of $1\times10^{-4}$ to $1\times10^{-12}$. Typical illustrations of salts coming within this definition are: sodium acetate, di- or trisodium citrate, disodium phosphate, sodium carbonate or bicarbonate, sodium sulfite ($Na_2SO_3$), sodium hydrosulfite ($Na_2S_2O_4$), borax or sodium tetraborate, and the corresponding potassium or ammonium salts.

By dilute aqueous solution, we mean a solution which contains the salt in a concentration not higher than 3% by weight (and which may be as low as 0.1% by weight).

When an alkali-metal salt of a weak acid is used, the preferential solubilization treatment according to this invention is usually carried out at an elevated temperature, say between 100° to 250° C., which of course implies the use of a closed container (at elevated pressure). In certain instances, a temperature range of 175° to 200° C. is preferred. After treatment, separation of the liquid phase from the solid is likewise preferably carried out at higher than room temperature, say in the range of 50° to 100° C., and preferably in the range of 85° to 100° C.

The quantity of alkaline reagent employed is preferably calculated in advance on the basis of the estimated content of the terephthalic acid impurity. For instance, if the commercial sample of isophthalic acid contains 2% of the para by-product, the exact quantity of sodium sulfite needed for neutralization thereof (assuming neutralization of but one of the COOH groups and conversion of $Na_2SO_3$ into $NaHSO_3$) can be readily calculated and will be referred to hereinafter as the theoretically equivalent quantity. For complete solubilization, however a quantity several times this theoretical quantity is desirable. Customarily, from 3 to 7 times the equivalent quantity will be employed. The lower limit is governed by the desire for speedy reaction and as nearly complete as possible elimination of the terephthalic acid. The upper limit is determined by the desire to avoid excessive neutralization (and consequent loss) of the valuable isophthalic constituent of the mass.

The quantity of water employed in the neutralization process also merits consideration. Inasmuch as the bulk of the isophthalic acid remains in solid form, sufficient water should be employed to make a readily stirrable slurry. Excessive quantities of water are uneconomical, because they would increase the size of the apparatus required and also would tend to increase the losses of the desired product through solution in the filtrates. As a thumb rule, 3 to 7 parts of water per part of crude mass to be treated are recommended.

The degree of purity of the isophthalic acid, both before and after purification according to this invention, is best judged by converting the entire mass into its acid chloride. The freezing point of essentially pure isophthaloyl chloride is between 43.45° C. and 44.0° C., whereas a sample which initially contains about 1% of terephthalic acid and about 1% jointly of toluic and benzoic acids possesses, after conversion into acid chloride, a freezing point of 43.0° C. The infrared spectrum of the acid chloride of the mass is also helpful. A product containing terephthaloyl chloride to the extent that the corresponding acid is normally found in commercial grades (0.6 to 2%) shows a distinct absorption band at 8.37 microns, whereas the acid chloride of a product purified according to this invention is free of this characteristic band.

The period of treatment is not critical and may vary on a plant scale from 15 minutes to 2 hours. With smaller quantities, however, satisfactory results may be achieved in a shorter time, say in a period of 5 to 15 minutes.

Without limiting this invention, the following examples are given to illustrate our preferred mode of operation. Parts mentioned are by weight.

*Example 1*

A suspension of 400 parts of a commercial grade of isophthalic acid of 98% purity (the impurities being essentially 1% of terephthalic acid and about 0.5% each of toluic acid and benzoic acid, and the mass itself being slightly yellow in color) in 2700 parts of water containing 20 parts of sodium sulfite ($Na_2SO_3$) was heated in an agitated stainless steel autoclave under autogenous pressure at 200° C. for one hour. The autoclave was then vented, whereby 500 parts of steam condensate was recovered. The remaining charge was cooled to 100° C. and filtered at this temperature. The filter cake was washed with water at approximately 75° C. until the filtrate was practically free of sulfite ions. The cake was then dried at 80° C. in an oven, giving 370 parts of dry, purified isophthalic acid.

A representative portion of this dry product was converted to the acid chloride by treatment with phosgene in an inert solvent in the presence of a small amount of dimethylformamide. The solvent and catalyst were then distilled off under a vacuum and followed by distilling over the acid chloride. The essentially white isophthaloyl chloride thus recovered was found to have a freezing point of 43.68° C., which corresponds to an estimated purity of 99.3–99.4%. The distilled product did not show any absorption band at 8.37 microns in the infrared spectrum, whereas the initial material showed a strong band at this point.

When a similar procedure with the same initial materials was carried out at room temperature, the product recovered had a freezing point of 43.35° C. and its infrared spectrum showed a definite band at 8.37 microns.

*Example 2*

A suspension of 300 parts of technical isophthalic acid containing 0.9% of terephthalic acid and approximately 1% of other organic impurities (mainly toluic and benzoic acids) in 2000 parts of water in which 28.5 parts of borax ($Na_2B_4O_7 \cdot 10H_2O$) had been dissolved, was heated under agitation in a stainless steel autoclave for one hour at a temperature of 200° C. and a pressure of 260 p.s.i.g. The suspension was then cooled to 90°–100° C. and filtered at this temperature. The cake was washed with warm water (40°–60° C.) until free of inorganic salts, using approximately 5 parts of water per part of isophthalic acid, and then dried, giving 265 parts of a colorless product. The distilled acid chloride obtained from this purified isophthalic acid had a freezing point of 43.65° C. and its infrared spectrum did not show any detectable absorption band for the para-isomer.

Isophthaloyl chloride of the same excellent quality (freezing points ranging from 43.65° to 43.67° C.) was obtained in several similar experiments, in one of which a three times larger amount (86 parts) of borax was employed, and the temperature held for 2 hours at 250° C., while in another experiment, using 28.5 parts borax, the temperature was held for 4 hours at 100° C. under atmospheric pressure.

*Examples 3, 4, and 5*

33 parts of the same commercial grade of isophthalic acid as in Example 2 were heated at 200° C. for 1 hour in 2000 parts of water containing one of the following salts:

| | Parts |
|---|---|
| Ex. 3: Disodium phosphate ($Na_2HPO_4 \cdot 7H_2O$) | 28.5 |
| Ex. 4: Potassium sulfite | 25 |
| Ex. 5: Sodium sulfite | 30 |

Similar results as in Example 2 were obtained, the distilled acid chloride of the respective products having a freezing point ranging from 43.64° to 43.70° C.

*Example 6*

100 parts of the same initial material as in Example 2 were heated for 4 hours at 110° C. under a pressure of 30 p.s.i.g. in 675 parts of water containing 4.2 parts of sodium carbonate. The isolated product gave an acid chloride whose freezing point after distillation was 43.54° C. (which is still an acceptable, high state of purity).

It will be understood that the details of the above examples may be varied widely within the skill of those engaged in this art. For instance, in lieu of or in addition to the salts specifically named in Examples 1 to 6, equivalent proportions of any of the following may be used: sodium tetraborate ($Na_2B_4O_7$), sodium hydrosulfite ($Na_2S_2O_4$), sodium bicarbonate, potassium metaborate or any of the alkali-metal borates, potassium carbonate or bicarbonate, potassium acetate, tri- or diammonium citrate, ammonium acetate, and others.

Also, while the above examples have been restricted to the use of salts of weak acids, it will be readily apparent that alkali-metal hydroxides, such as NaOH, KOH or $NH_4OH$ can also be used as alkaline reagents. Moreover, as will be further readily apparent, high temperatures and superatmospheric pressures become superfluous when the more strongly basic hydroxides are used. Accordingly, the mode of procedure becomes simplified, permitting the use of atmospheric pressures and temperatures of 80° to 100° C., as more fully illustrated by the following additional examples.

*Example 7*

40 parts of 28% aqueous ammonia are added, with stirring, to a slurry of 600 parts of water and 200 parts of commercial grade isophthalic acid (97.9% purity) maintained at 95–100° C. in a vessel equipped with a reflux condenser. After 2 hours heating at the same temperature, the slurry is cooled to about 70° C., filtered hot, washed with water and dried. 130 parts of isophthalic acid are obtained which, upon conversion into isophthaloyl chloride, has a freezing point of 43.44° C. The latter corresponds to a purity of 98.9%.

*Example 8*

By following the details of Example 7, 20 parts of 27% aqueous ammonia are added to a slurry of 40 parts of water and 15 parts of commercial grade isophthalic acid (98.0% purity) at 93°–98° C. with stirring. After 2 hours heating, the slurry is filtered, washed and dried, giving a yield of 83%. The isophthaloyl chloride obtained from this product has a freezing point of 43.55° C., which is equivalent to an acid purity of 99.1%.

*Example 9*

By following the details of Example 7, 1 part of sodium hydroxide (in the form of a 50% aqueous solution) is added to a slurry of 15 parts of commercial grade isophthalic acid (98.0% purity) in 45 parts of water at 95°–98° C. with stirring. After 30 minutes heating, the slurry is filtered, washed and dried, giving a yield of 83.4% purified acid. The isophthaloyl chloride has a freezing point of 43.65° C., which is equivalent to an acid purity of 99.3%.

*Example 10*

By following the details of Example 7, 1.6 parts of potassium hydroxide (in the form of a 45% aqueous solution) are added to a slurry of 15 parts of commercial grade isophthalic acid (98.0% purity) in 50 parts of water at 95°–98° C. with stirring. After a reaction time of 1 hour, the treated acid is filtered, washed and dried, giving a yield of 84.5%. The isophthaloyl chloride obtained from this acid has a freezing point of 43.60° C., which is equivalent to an acid purity of 99.2%.

We are aware of attempts in the prior art of separating terephthalic and isophthalic acids by converting the entire mixture into an alkali-metal salt and then resorting to differential salting out or preferential dissolution of one of these components. Our process distinguishes basically from such prior art processes in that we employ preferential neutralization, that is, we convert into a salt only a small portion of the initial mass. Furthermore, because of the relatively high solubility of the alkali-metal salts of both the isophthalic and terephthalic acid, only relatively crude separation of the two can be achieved by said prior-art procedures, and removal of the final 2 or so percent of the terephthalic impurity becomes impractical. By our method, however, essentially chemically pure isophthalic acid is obtained. Finally, the isophthalic product in our invention is already in acid form and need not be reconverted as would be required in those processes which employ complete neutralization.

The selection in this invention of salts of buffer acids, within the range of K-values above indicated, constitutes a special improvement on the basic concept and is based on experimental evidence. Thus the use of salts of stronger acids, such as sodium bisulfite, sodium bisulfate and sodium sulfate, failed to give the degree of purification achievable according to this invention.

We claim as our invention:

1. A process of purifying a mass of commercially produced isophthalic acid containing as an impurity terephthalic acid in quantity not exceeding 3% by weight of the whole, which comprises treating the mass of isophthalic acid with an alkali-metal salt of a water-soluble acid whose ionization constant has a value in the range of $1 \times 10^{-4}$ to $1 \times 10^{-12}$, thereby solubilizing the terephthalic acid by converting the same into an alkali metal salt without substantially solubilizing the solid isophthalic acid mass the quantity of said alkali-metal salt being from 3 to 7 times the quantity stoichiometrically equivalent to the terephthalic acid content of the mass, and said treatment being achieved by using an aqueous solution of said alkali-metal salt of not more than 3% concentration and by carrying out the treatment at a temperature between 100° and 250° C., and separating the residual solid mass from the aqueous phase.

2. A process as in claim 1, wherein the alkali-metal salt employed is sodium sulfite.

3. A process as in claim 1, wherein the alkali-metal salt employed is an alkali-metal borate.

4. A process as in claim 1, wherein the alkali-metal salt employed is ammonium acetate.

5. A process of purifying a solid mass of commercially produced isophthalic acid containing as an impurity terephthalic acid in quantity not exceeding 5% by weight of the whole, the steps which consist of treating at a temperature between 80° and 250° C. said mass of isophthalic acid with a dilute, aqueous solution of an alkaline reagent selected from the group consisting of alkali metal salts of water-soluble, weak acids and alkali metal hydroxides, thereby solubilizing the terephthalic acid by converting the same into an alkali metal salt without substantially solubilizing the solid isophthalic acid mass, and separating the water-solubilized impurity from the solid bulk of the isophthalic acid mass.

6. A process of purifying a solid mass of commercially produced isophthalic acid containing as an impurity terephthalic acid in quantity not exceeding 5% by weight of the whole, the steps which consist of treating at a temperature between 80° and 250° C. said mass of isophthalic acid with a dilute aqueous solution of an alkaline-reacting, water-soluble alkali metal compound in quantity not less than that which is stoichiometrically equivalent to the terephthalic acid content of the mass but not more than seven times said quantity, thereby solubilizing the terephthalic acid by converting the same into an alkali metal salt without substantially solubilizing the solid isophthalic acid mass, and separating the water-solubilized impurity from the solid bulk of the isophthalic acid mass.

References Cited by the Examiner

UNITED STATES PATENTS

| 1,945,246 | 1/34 | Witzel | 260—525 |
| 2,745,872 | 5/56 | Carlson et al. | 260—525 |

OTHER REFERENCES

Ostwald: Z. für Physikalische Chemie, 3, pp. 376–7.

LORRAINE A. WEINBERGER, *Primary Examiner.*

LEON ZITVER, *Examiner.*